United States Patent [19]
Davis et al.

[11] Patent Number: 5,201,606
[45] Date of Patent: Apr. 13, 1993

[54] THERMAL STORAGE TANK AND ASSOCIATED TOP STRUCTURE

[75] Inventors: Thomas L. Davis; Robert N. Elliott, III, both of Raleigh; Carsie K. Denning, Coats, all of N.C.

[73] Assignees: Carolina Power & Light Company, Raleigh; North Carolina Alternative Energy Corporation, Research Triangle Park, both of N.C.

[21] Appl. No.: 658,527

[22] Filed: Feb. 21, 1991

Related U.S. Application Data

[62] Division of Ser. No. 543,360, Jun. 25, 1990.

[51] Int. Cl.$^5$ .................................................. B65G 5/00
[52] U.S. Cl. .......................................... 405/55; 405/53; 405/210; 106/672
[58] Field of Search ................................ 405/53-59, 405/128, 129, 210; 62/53.1, 260; 106/672, 409

[56] References Cited

U.S. PATENT DOCUMENTS

| | | |
|---|---|---|
| 3,106,824 | 10/1963 | Gregory . |
| 3,669,701 | 6/1972 | Biederman, Jr. . |
| 3,782,985 | 1/1974 | Gebhardt . |
| 3,902,911 | 9/1975 | Messenger ...................... 106/672 X |
| 3,961,978 | 6/1976 | Brodmann ........................... 106/409 |
| 4,011,736 | 3/1977 | Harrison . |
| 4,136,493 | 1/1979 | Bradford et al. .................. 405/55 X |
| 4,183,221 | 1/1980 | Yamamoto . |
| 4,237,859 | 12/1980 | Goettl ............................... 405/53 X |
| 4,268,317 | 5/1981 | Rayl .................................. 106/672 X |
| 4,298,386 | 11/1981 | Kubo et al. ...................... 106/672 X |
| 4,330,632 | 5/1982 | Haynes et al. ................... 106/672 X |
| 4,467,040 | 8/1984 | Bruni et al. ...................... 106/672 X |
| 4,501,830 | 2/1985 | Miller et al. . |
| 4,504,320 | 3/1985 | Rizer et al. . |
| 4,512,684 | 4/1985 | Hale et al. ....................... 405/210 X |
| 4,657,810 | 4/1987 | Douden ........................... 106/409 X |
| 4,778,628 | 10/1988 | Saha et al. ........................ 405/55 X |
| 4,801,563 | 1/1989 | White .............................. 106/672 X |
| 4,822,422 | 4/1989 | Sugama .............................. 106/672 |
| 4,871,078 | 10/1989 | Sharp ................................... 405/53 |
| 4,905,439 | 3/1990 | Filteau ............................ 106/672 X |
| 4,915,545 | 4/1990 | Ferrari ................................ 405/53 |

FOREIGN PATENT DOCUMENTS

| | | | |
|---|---|---|---|
| 1957175 | 5/1971 | Fed. Rep. of Germany ........ 405/53 |
| 1330244 | 8/1987 | U.S.S.R. ................................ 405/53 |

*Primary Examiner*—Dennis L. Taylor
*Assistant Examiner*—J. Russell McBee
*Attorney, Agent, or Firm*—Richard Faust

[57] ABSTRACT

Disclosed is a thermal storage tank for the long term storage of a thermal storage medium whose energy is available on demand for satisfying cooling or heating loads. The tank may be earth excavated and include side walls of a lightweight, high strength concrete that retains its thermal insulating characteristics even when exposed to groundwater. A unique inverted frustrum shape for the tank offers numerous advantages. In association with a cold storage tank, a novel submerged, single point ice introduction system provides a much improved formation of the ice mass in the tank. Also provided for the cold storage tank is a novel floating top that provides a ballast effect to keep the ice mass submerged.

8 Claims, 6 Drawing Sheets

THERMAL STORAGE TANK AND ASSOCIATED TOP STRUCTURE

This is a division of application Ser. No. 07/543,360, filed Jun. 25, 1990.

FIELD OF THE INVENTION

The invention relates to storage tanks for fluids. More particularly, the invention relates to a storage tank adapted for long term storage of an ice/water mixture, chilled water or the like with minimal heat transfer losses at the boundaries. Specific applications for the tanks are found in energy storage systems used to shift electric energy usage from the electric utility's peak load periods.

BACKGROUND OF THE INVENTION

In recent years, electric utilities have discovered the desirability of leveling or reducing their peak load energy usage, especially during summer months. Concurrent with the development of the present invention, a long term energy storage system has been proposed in which a prime mover, such as an ice machine, is operated on a continuous basis for a period of months, or even year-round. In the operation of such a system, the ice is stored for use on demand during periods that coincide with the electric utility's seasonal peak load operating times in the summer, for example, to provide space air conditioning, harvested crop cooling, greenhouse space cooling, poultry house cooling, etc. This system enables the electric utility to substitute a relatively small long term level load for a much higher direct acting load that would coincide with or largely overlap the utility's seasonal peak usage. Further, the customer benefits by purchasing a significant amount of his electricity at a less expensive, "off peak" or "load levelled" rate.

The above system that utilizes an annual ice thermal storage cooling system is discussed in detail in a commonly assigned application Ser. No. 543,169, filed on even date herewith, entitled "Long Term Thermal Energy Production, Storage and Reclaim System", now U.S. Pat. No. 5,046,551. A primary purpose of the present invention is to provide a storage tank for long term storage of the ice generated in the operation of the system described in the co-pending application.

Significant technology exists in the area of above ground storage tanks for fluids. Some of these tanks incorporate thermal insulation. These tanks could, with significant modification, adequately serve as the thermal storage tank for ice storage systems of the type discussed above. However, the cost, space requirements and unsightliness of above ground storage tanks render this approach impractical for long term ice storage located at commercial properties, residences, farms, etc.

Earth-excavated storage tanks have been found to offer substantial promise for long term thermal storage needs. First, these tanks can be substantially or totally hidden from view. Second, earth-excavated tanks generally are the least expensive volumes for storing large volumes of fluid.

The most common proposals for earth-excavated thermal storage tanks take the form of double wall structures wherein the two walls are separated by an air space. However, the expense of double wall construction is high, and in some cases exorbitant. Also, unless the outer wall is impervious to ground water seepage, the space between the walls must be provided with mean for discharging water that fills this space, for example, by a sump pump.

A double wall earth-excavated storage tank having solid insulating material between the two walls is described in U.S. Pat. No. 4,183,221. Another type of double wall earth-excavated tank having incompressible insulating material between a pair of thin plastic walls is shown in U.S. Pat. No. 4,011,736.

Thus, the construction of a single wall thickness earth-excavated thermal storage tank would be desirable to avoid the complexities and expense of double wall structures. However, the wall material of such a tank must provide sufficient strength, durability and long term thermal insulating characteristics even when exposed for years to the earth and groundwater. Conventional insulating materials such as fiberglass, mineral wood and cellulose meet none of the above requirements. These materials must be layered in conjunction with the structural components of the tank and kept dry by liners or other means. Other materials, such as polystyrene, polyurethane and rigid fiberglass are marginal in terms of durability and strength and are absolutely unsatisfactory from a long term thermal insulating standpoint since they lose their thermal insulating properties when wet. It is known that conventional concrete provides adequate strength and durability, but conventional concrete is a relatively poor thermal insulator when dry, and even worse when wet. Finally, concrete materials containing various insulating materials have been proposed for use in the construction industry for thermal insulation. These concretes, which use vermiculite, ground rigid polystyrene, or other similar materials as the aggregate, provide adequate insulation but have poor strength, thus rendering them inappropriate as a substitute for structural concrete. Furthermore, these concrete materials lose their thermal insulating properties when they become wet. Most recently, studies conducted on behalf of Oak Ridge National Laboratories of Oak Ridge, Tenn. have been directed to the development of a thermally insulating concrete having a moderate strength so that it can be used as the wall component of low rise buildings.

None of the above materials meet the requirements for a single wall thickness earth excavated storage tank Thus, the provision of long term energy storage in such tanks requires an advancement that will permit tank construction at reasonable cost, and provide the required properties stated above.

Turning to another aspect of the present invention, in thermal storage tanks that store ice in an ice/water mixture there is a need for an efficient manner and means for introducing ice into the tank to achieve a stable, buoyant iceberg shape. Also, there is no known system for matching the manner of introducing the ice into the mixture with the geometry of the tank. It would be desirable to match these system features to make the thermal storage more efficient and to minimize "dead space" in the tank. Furthermore, it is desirable to provide a ballast to the ice mass in the tank to maintain the ice mass in a submerged state to prevent sublimation losses.

SUMMARY OF THE INVENTION

The present invention provides a novel and cost efficient thermal storage tank for us in the long term (e.g. annual) storage of thermal energy for use on demand at the electric utility's peak load times. In one aspect the storage tank takes the form of an earth-excavated tank of single wall thickness wherein the tank walls are formed of a concrete material whose primary aggregate constituent consists of particles having thermal insulation characteristics that are not materially degraded by exposure to moisture. Thus, with the selection of an appropriate aggregate the concrete walls of the tank has the structural integrity of ordinary concrete while exhibiting extraordinary thermal insulating characteristics. Furthermore, where the aggregate particles are of an extreme lightweight nature as preferred, the concrete may have a lightweight characteristic that renders it easier to handle. Because the aggregate particles of the concrete retain their thermal insulating characteristics when wet, the storage tank will retain its thermal insulation even when exposed to groundwater, thereby negating the need for a complex and expensive double wall structure or other techniques. The aggregate particles preferably are hollow, gas filled particles, with the most preferred particles being cenospheres which are produced as a by-product of low sulphur bituminous coal combustion. The thermal storage tank may be formed by pouring and curing the concrete in place or, alternatively, the walls of the tank may be of modular construction formed of concrete slabs constructed outside the excavation and moved into place and grouted.

In another aspect the present invention may be defined as a thermal storage tank system for holding an ice/water mixture whose thermal energy is available on demand. According to this system the ice is discharged into the tank at a single point that is submerged proximate the bottom of the tank. The tank has the shape of an inverted frustrum, preferably an inverted obelisk, so as to accommodate the inverted angle of repose of the ice emerging from the ice discharge into the ice/water mixture in the tank. According to this and other preferred embodiments of the invention the thermal storage tank includes a thermally insulating top that provides a ballast for the ice mass. The top may be formed of a lightweight concrete material similar to that used for the tank walls.

BRIEF DESCRIPTION OF THE DRAWINGS

Some of the objects having been stated, other objects will appear as the description proceeds, when taken in connection with the accompanying drawings, in which.

DETAILED DESCRIPTION OF THE INVENTION

Figure 1:
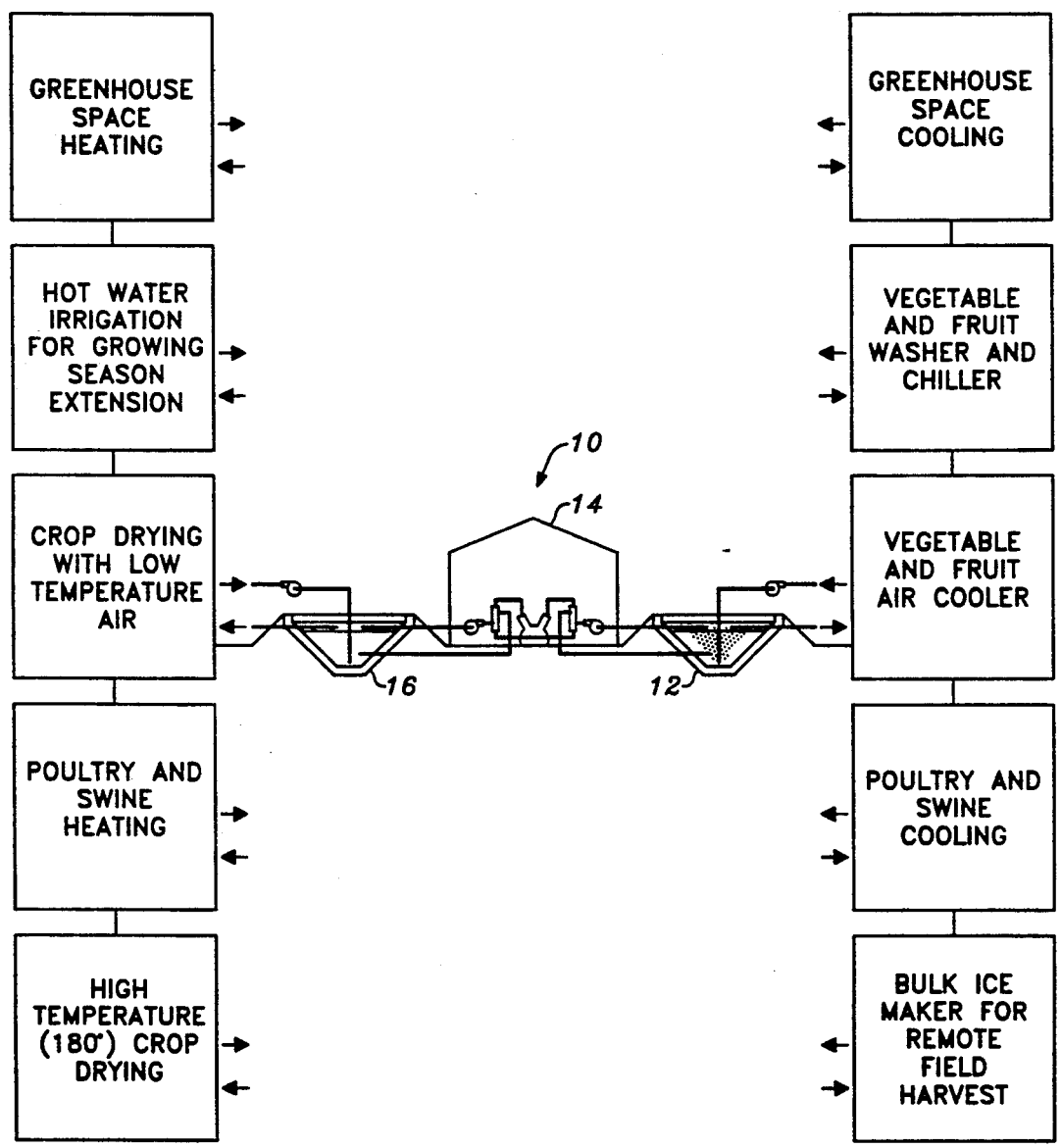
FIG. 1 is a schematic representation of a long term thermal energy storage system which incorporates an earth-excavated thermal storage tank constructed in accordance with the principles of the present invention.

Referring to the drawings, particularly to FIG. 1, there is shown in schematic form an annual thermal energy storage system 10 for agricultural uses which incorporates a cold storage tank 12 constructed in accordance with the principles of the present invention. A vapor compression ice machine 14 operates continuously year-round and delivers ice to tank 12 for use in one or more cooling operations in the summer months. Waste heat generated by ice machine 14 can be delivered to a hot storage tank 16 for use in heating applications in the winter months. The system permits the use of a prime mover (the ice machine) that is less than 10% the size of the prime mover that would be necessary to provide direct action cooling under a conventional direct acting system. System 10 is described in detail in the above-mentioned commonly assigned U.S. Pat. No. 5,046,551, the teachings of which are incorporated herein by reference.

Storage Tank Walls

Figure 2:
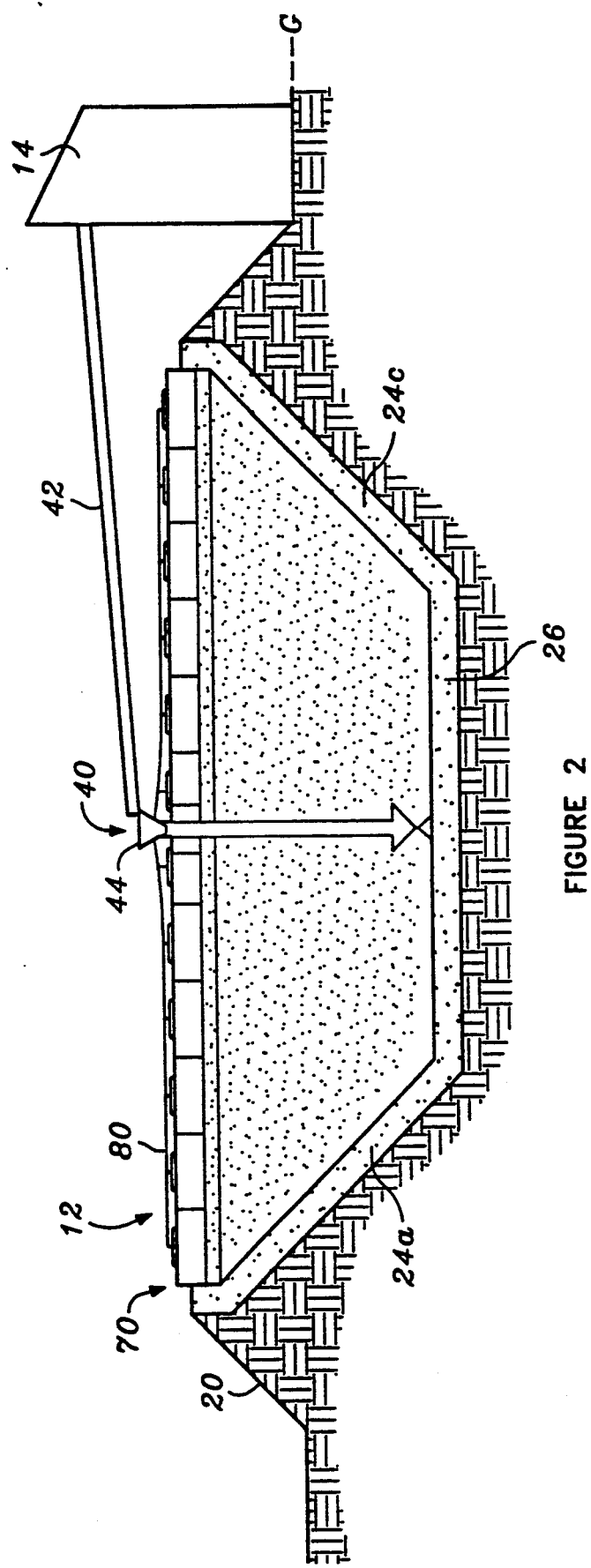
FIG. 2 is a vertical cross sectional view of an earth-excavated thermal storage tank of the invention.
Figure 3:
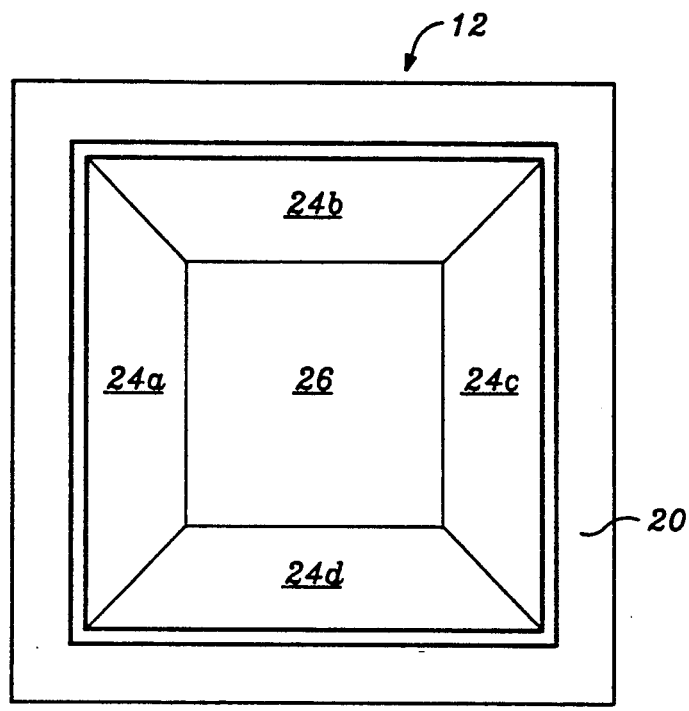
FIG. 3 is a plan view of the tank of FIG. 2, with the top removed.
Figure 4:
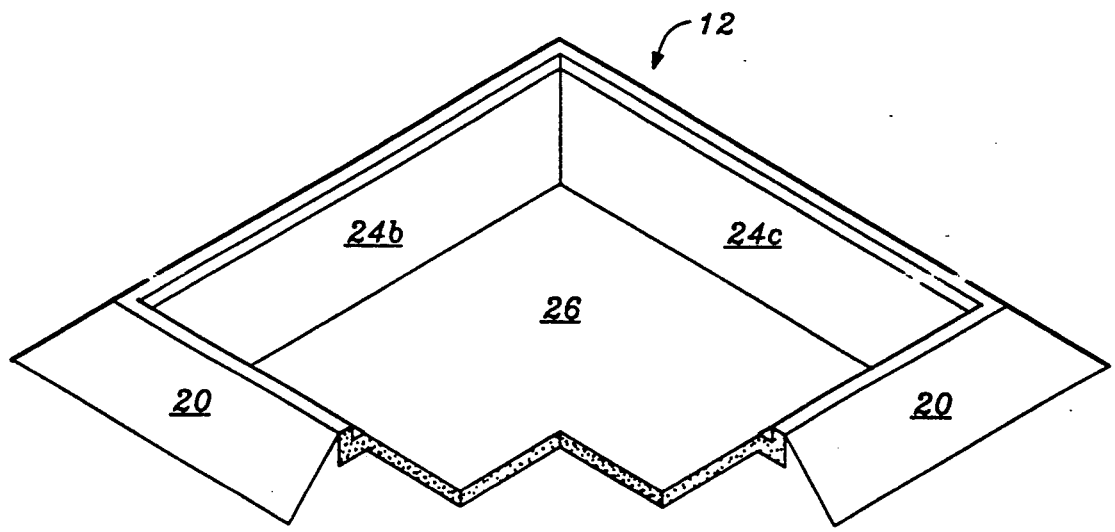
FIG. 4 is a schematic, isometric, partial sectional view of the storage tank, with the top removed.

Referring to FIGS. 2-4, the discussion will now turn to a general description of the wall structure of a representative storage tank 12 constructed in accordance with the present invention. Tank 12 is formed as an earth-excavated, single wall thickness tank. The existing grade is shown at G in FIG. 2. While most of tank 12 is below grade, a berm 20 formed from excavation spoil covers the upper portion of the tank's side. As an alternative, of course, the upper level of tank 12 may be located substantially on grade. The walls of tank 12, side walls 24a, 24b, 24c, 24d and a bottom wall or base 26, are formed of a lightweight, high-strength, thermally insulating concrete material which is described in detail below. The size of tank 12 and the thermal insulating value of the walls are selected so that tank 12 may hold the required volume of a thermal storage medium and hold the thermal losses at the boundaries to an acceptable level.

The material for the walls of tank 12 must be compatible with earth-excavated construction and must have a thermal insulating property that will not materially degrade when the walls are exposed to moisture, particularly from the water table. To this end, the inventive design of tank 12 utilizes a concrete wall material whose primary aggregate constituent consists of particles having thermal insulation characteristics that are not materially degraded by exposure to moisture. An ideal aggregate is so-called "cenospheres". Cenospheres are hollow, amorphous glass spheres that are a by-product of low sulphur bituminous coal combustion. Cenospheres are harvested from the surfaces of power plant ash ponds and are readily available from local power plants. The particle size distribution of cenospheres typically is in the range from about 10 microns to about 150 microns. It has been found that cenospheres have excellent thermal insulating characteristics owing primarily to the insulating effect of the gas trapped in the hollow spheres. When wet, the cenospheres retain their thermal insulating characteristics.

It has been discovered that concrete utilizing cenospheres as the aggregate has remarkable qualities that make it ideal for use in the single wall thickness storage tanks of the present invention. First, the extreme light weight of the cenospheres is responsible for a concrete product that is lightweight, making the concrete easier to work with and less costly to transport. Second, the concrete has surprisingly high strength, with a 3:1 volumetric ratio of cenospheres to portland cement producing a structural grade concrete. Third, the concrete has a low modulus of elasticity. Fourth, the concrete has a very low thermal conductivity when dry. Fifth, because the cenosphere retain their structural integrity in the cured concrete, the gas within the cenospheres serves to retain the low thermal conductivity of the concrete even when it is water saturated from contact with groundwater.

Table 1, below, sets forth the cured density and thermal conductivity for three cured concrete materials having volumetric ratios of cenospheres aggregate to portland cement of 3:1, 8:1 and 12:1. The table compares these characteristics to those of a baseline concrete as defined in "Standard Handbook for Mechanical Engineers" by Marks.

TABLE 1

| Volumetric Ratio (cenosphere/ portland cement) | Cured Density (lbs/ft$^3$) | Thermal Conductivity (BTU/hour/ft$^2$/°F./ft) | |
|---|---|---|---|
| | | @ 32° F. | @ 75° F. |
| 3:1 | 70 | 0.403 | 0.329 |
| 8:1 | 50 | 0.269 | 0.226 |
| 12:1 | 42 | 0.213 | 0.174 |
| Baseline Concrete | 142 | — | 1.05 |

Turning back to FIGS. 2 and 3, a more detailed description of the construction and structure of tank 12 will now be given. A site for the tank is chosen in reasonably close proximity to the area(s) to be cooled or heated by the stored thermal energy. The site is cleared and excavated using appropriate excavation equipment. One advantage of the invention is that the size and shape requirements for the illustrated tank permit the excavation to be accomplished with readily available farm equipment.

Utilizing conventional concrete forms, the concrete may be poured in place to form the bottom wall and the inclined side walls. The upper portion of the tank is supported by the berm 20. Rebar reinforcement structure in the tank walls, particularly at the upper level, assists in preventing collapse of the inclined walls.

As an alternative to pouring the walls in place, the walls may be of modular construction wherein slabs are formed outside of the excavation and then lowered into place. The slabs preferably are secured and sealed with grout. For this modular approach, the higher cenosphere content in the concrete is desirable to reduce the weight and handling requirements for the slabs.

As shown above in Table 1, the 3:1 cenospheres aggregate concrete is somewhat heavier than water, while 8:1 and 12:1 concrete floats. Therefore, it may be desired in certain construction procedures to use the 3:1 concrete for the portion of the tank below the water table to facilitate the construction process.

According to one embodiment of a tank such as the one illustrated in FIGS. 2-4, the tank has a depth below the top of berm 20 of 26 feet. The top of the tank is a square that is 100 feet on a side. The four side walls are inclined at an angle of approximately 45° from vertical. The bottom wall or base of the tank is a square that is 53 feet on a side. The tank wall thickness is 36 inches. The resulting tank has a capacity of approximately 800,000 gallons.

Several considerations are important in choosing a shape for tank 12. First, it is desirable to have a shape that minimizes heat transfer losses across the boundaries of the tank. From this standpoint, the optimum shape would be a sphere since spheres have minimum surface area per unit volume. However, a second consideration is that the tank be easily formed by earth excavation equipment. For cold storage tanks designed to hold a submerged agglomerated ice mass, a third consideration, discussed in more detail below, is that the tank shape should preferably approximate the shape of the ice mass, thereby reducing dead space in the tank that would not fill with ice as the ice mass is formed. The shape selected as the preferred shape is an inverted frustrum. The inverted frustrum may have as its base a polygon of any number of sides. The smallest number of sides, three, would of course produce a triangular base. A infinite number of "sides" would produce the circular base; i.e., the circular base of an inverted frustrum of a right circular cone. Since the agglomerated ice mass formed in the tank is substantially symmetrical, as viewed in plan, an equilateral polygon base for the inverted frustrum is preferred. To this end, tank 12 takes the form of an inverted frustrum of a square pyramid, i.e., an inverted obelish. This shape produces four inclined sides 24a, 24 b, 24c, 24d and a square, flat bottom 26. This shape provides an excellent low surface area to unit volume to minimize heat transfer losses at the boundaries. It is a shape that is easily excavated by conventional earth excavation equipment. Lastly, it is a shape that roughly approximates the shape of the agglomerated ice mass that forms in the tank with a centrally located single point of ice discharge.

The incline of side walls 24a, 24b, 24c, 24d must be chosen so that it does not exceed the "support angle" for the soil in which the tank is being formed. Support angle is the maximum angle (measured from horizontal) at which the wall of an excavation will be self supporting in a particular soil. In most soils a support angle of 45° or greater is achievable. The angle of inclination for side walls 24a, 24b, 24c, 24d is approximately 45°, with a range of about 30° to about 70° being appropriate for other excavations.

The concrete for the tank walls has a volumetric ratio of cenospheres to portland cement of 3:1 to 2:1, with a ratio approximately in the middle of the range (8:1) being preferred. Referring back to Table 1, the thermal conductivity of the 8:1 concrete at 32° F. is approximately 0.269 BTU/hour/ft$^2$/° F./ft. A concrete wall thickness of 36 inches produces a satisfactory thermal insulation of 0.807 BTU/hour/ft$^2$/° F. at the tank boundaries. As explained in U.S. Pat. No. 5,046,551, over an entire annual ice storage cycle, energy losses at the boundary may be kept to approximately 30 percent with this structure (and the insulating top discussed below).

Ice Introduction and Building of Ice Mass

Figure 5:
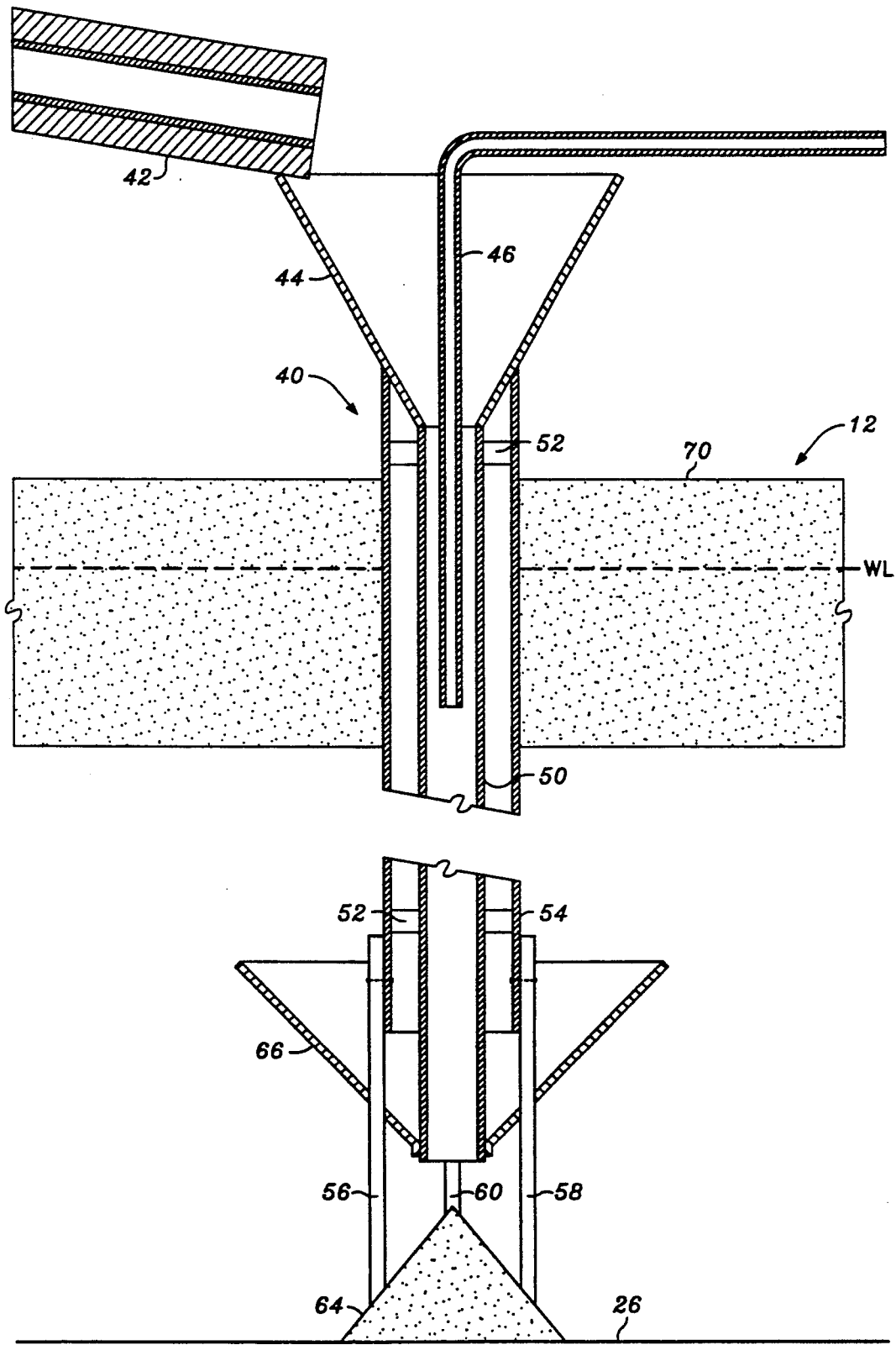
FIG. 5 is an enlarged, fragmentary view of portions of the tank and illustrating the ice delivery system which provides single point, submerged ice discharge proximate the bottom of the tank.

With primary reference to FIGS. 2 and 5, the introduction of ice into tank 12 and the building of an ice mass in the tank will now be described. An ice introduction system 40 is designed to introduce pieces of ice at a submerged, single point discharge proximate the bottom of tank 12. It has been discovered that when ice is discharged at a single point into water the ice produces an ice mass having an inverted angle of repose, analogous to the positive angle of repose created by the single point discharge of fluid particles on to a surface, for example, grain discharged from an elevated auger. The pieces of ice form an agglomerated ice mass that may grow from a relatively small size (for example, the 15% ice fraction illustrated in FIGS. 6 and 8) to a relatively large size (for example, the 85% ice fraction illustrated in FIGS. 7 and 9). As it is built, the ice mass retains a shape that roughly approximates that of the inverted frustrum of a right circular cone which, as explained above, is roughly approximated by the inverted obelisk shape of the tank, thereby avoiding tank dead spaces into which ice will not migrate.

Ice introduction system 40 is connected to ice machine 14 by an ice conveyance conduit 42 which conveys pieces of ice to a hopper 44. Hopper 44 is secured in position to the top of tank 12 and terminates above the water level in the tank. A water jet 46 which provides a high velocity water flow is introduced into tank 12 through the bottom opening in hopper 44. The water jet terminates below the water level in the tank, for example, one to two feet below the water level. The lower end portion of water jet 46 is encased within an ice introduction pipe 50 which runs from the top of tank 12 to a single discharge point submerged in the tank proximate the bottom thereof, for example, two feet from the bottom. Pipe 50, in turn, is supported by means of spiders 52 within an outer casing 54. As best shown in FIG. 5, casing 54 is secured at its upper end to the top and at its lower end it is secured to four support posts 56, 58, 60 and 62 (not shown).

As stated above, pieces of ice are introduced into hopper 44 by means of the ice conveyance conduit 42. Preferably, the pieces of ice are washed into hopper 44 by means of wash water which flows within conduit 42 with the pieces of ice. By an induced flow, the pieces of ice are entrained in the water emerging from water jet 46 and carried through pipe 50 to the single point discharge proximate the bottom of the tank. The water jet provides sufficient water velocity and flow rate so that the drag on the ice particles created by the jet exceeds the buoyancy of the particles, thereby propelling the particles to the discharge point at the bottom of the tank. As the pieces of ice are discharged they are dispersed outwardly by a conical diverter 64 which is secured to the bottom of the tank. Also, a second diverter 66 further disperses the ice and prevents ice from entering the opening formed between pipe 50 and casing 54 so that this opening may be used for withdrawing water from the tank.

In one preferred embodiment of the ice introduction system 40, hopper 44 has a height of approximately 4 feet and walls that are inclined at about 60° from the horizontal. Ice enters the hopper at approximately 90 pounds per minute along with a wash water of approximately 120 gallons per minute. The water jet 46 produces a 130 gallon per minute jet of water which entrains the pieces of ice within pipe 50. Pipe 50 has an inside diameter of approximately 8 inches while casing 54 has an inside diameter of approximately 18 inches. While not illustrated, in certain applications it is desirable that a venturi nozzle be provided inside of pipe 50 just downstream of the end of water jet 46.

While the ice introduction system has been described as a flow induced, entrained system, other means such as an auger or a bucket conveyance may be used.

Floating Top

Tanks 12, 112 and 212 (FIGS. 2, 6-7 and 8-9, respectively) are provided with floating tops 70, 170 and 270. In each case the top serves several purposes. First, the top is formed of thermally insulating material to reduce thermal losses for the entire envelope. Second, the top has sufficient weight to provide a counter-buoyant force to the agglomerated ice mass to keep the ice mass submerged in water. Third, the top prevents a solid/gas interface of ice to air, thereby eliminating thermal losses due to sublimation.

As shown in FIG. 2 and FIGS. 6-9, the illustrated tops 70, 170, 270 preferably are formed of a plurality of discrete floatable elements. In the illustrated embodiments these elements are formed of concrete material whose primary aggregate comprises cenospheres. As discussed in detail above, by varying the cenospheres to portland cement ratio the density of the resulting concrete may be easily controlled within a wide range of densities.

Figure 6:
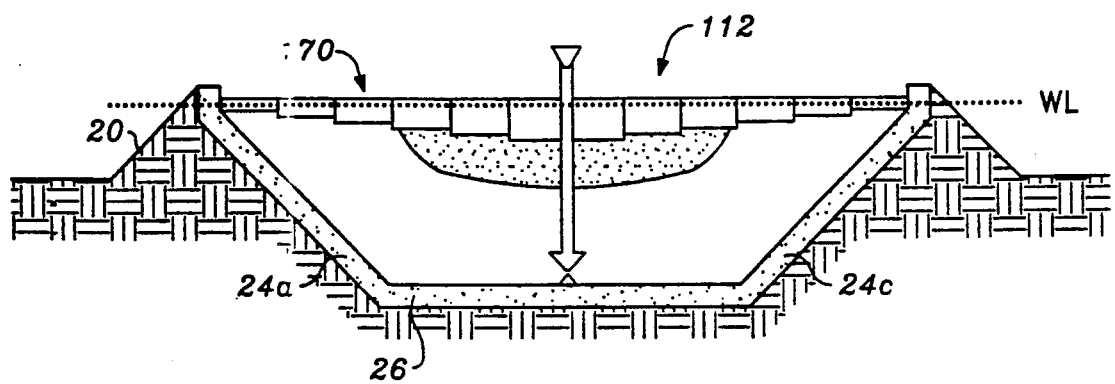
FIG. 6 is a vertical cross sectional view of a thermal storage tank of the invention with a low charge of ice. The tank has a floating top formed of discrete, lightweight concrete blocks of the same density, with thicker blocks toward the center and progressively thinner blocks toward the perimeter.
Figure 7:
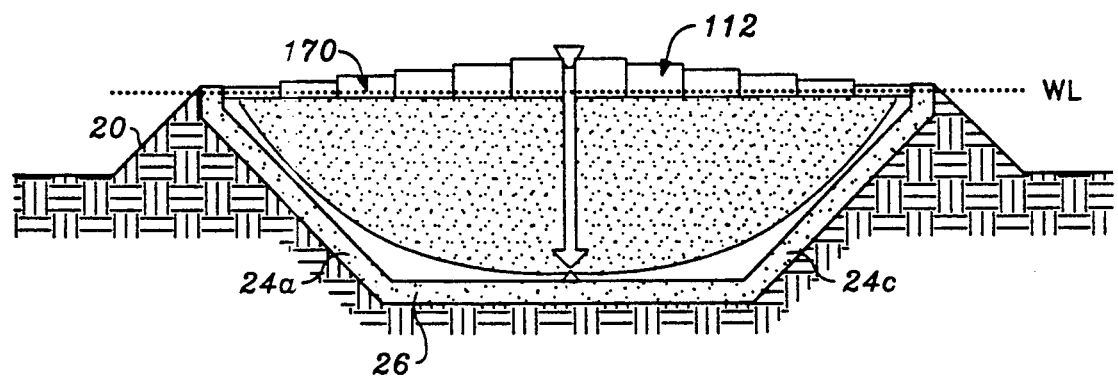
FIG. 7 shows the thermal storage tank of FIG. 6 with a full charge of ice.

In the embodiment illustrated in FIGS. 6 and 7, the concrete blocks of top 170 are formed of concrete having substantially the same density. However, the centrally located blocks have a greater thickness and thus a greater weight per unit area (as viewed in plan). The blocks become progressively thinner as they move outwardly towards the perimeter of the tank 112. As shown in FIGS. 6-9, the ice mass has a shape that has been referred to above as roughly approximating the inverted frustrum of a right circular cone. Accordingly, at the center of the tank there is a substantially thicker mass of ice per unit area, and progressively less thickness of ice toward the perimeter of the tank. Thus, the buoyant force exerted by the ice mass at the center of the tank is significantly greater than that exerted at the perimeter. Tops 170 and 270 have been designed to exert a proportionately greater downward counter-buoyant force where the ice mass is thicker and a proportionately lesser downward counter-buoyant force where the ice mass is thinner. The above assumes that the agglomerated ice mass is not monolithic — due to its formation from discrete pieces of ice and factures contained therein.

FIG. 6 illustrates the situation where the ice fraction in the tank is very low, for example, at 15%. In this state the buoyant forces of the ice mass are relatively small and, therefore, the concrete blocks of top 170 float relatively low in the tank as shown by their position with respect to the water line, WL. In contrast, in FIG. 7 the ice fraction is approximately 85% resulting in substantial buoyant forces created by the ice mass. Accordingly, the concrete blocks of the floating top have been lifted by the buoyant forces of the ice mass. However, the weight of floating top 170 is sufficient to maintain the ice mass in a submerged state when the tank is fully charged.

It will be appreciated that the expanded volume of the tank between the situation illustrated in FIG. 6 and that of FIG. 7 occurs due to the fact that ice has a greater volume than an equal mass of water; thus, as the ice fraction increases the volume of H₂O contained in the tank increases.

Figure 8:
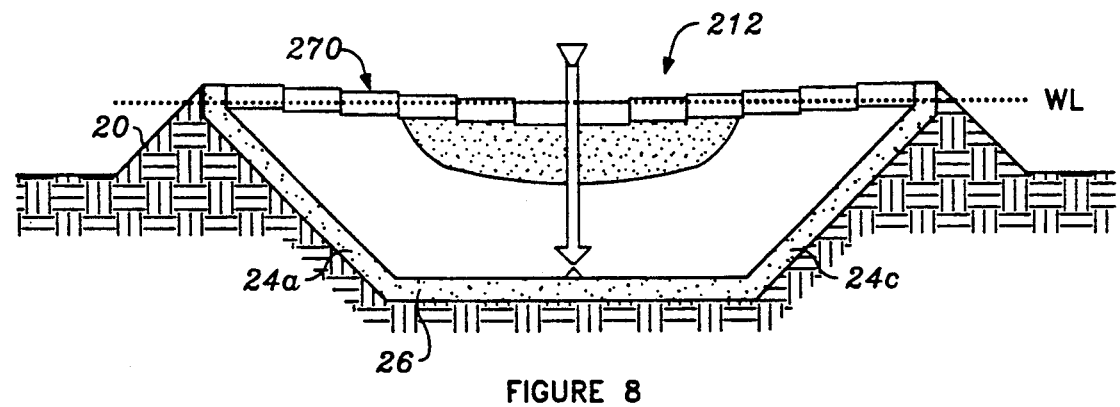
FIG. 8 is a vertical cross sectional view of another thermal storage tank of the invention with a low charge of ice. The tank has a floating top formed of discrete, lightweight concrete blocks of uniform thickness; however, the blocks toward the center have a higher density and the blocks toward the perimeter have a progressively lower density.
Figure 9:
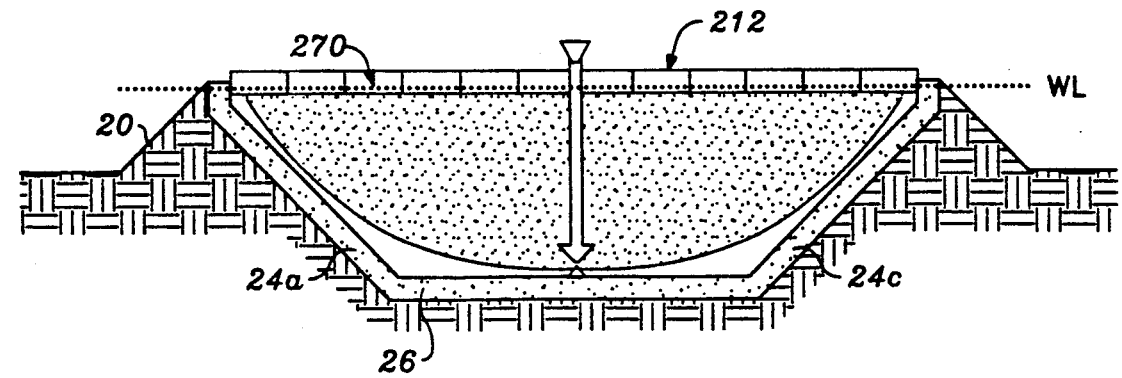
FIG. 9 shows the thermal storage tank of FIG. 8 with a full charge of ice.

FIGS. 8 and 9 illustrate a tank 212 with a floating top 270 similar to that of FIGS. 6 and 7 with a similar distribution of weight from the center of the top to its perimeter. However, according to the embodiment of FIGS. 8 and 9 the weight distribution is achieved by utilizing discrete floatable concrete blocks having substantially the same thickness, with the centrally located elements having a greater density than those located toward the perimeter. The structure is achieved by utilizing cenosphere-aggregate concrete of the type mentioned above. The more dense centrally located blocks may be made of concrete having a density on the order of 55 lbs./ft.³ (approximately 6:1 cenospheres to portland cement ratio) with the perimeter blocks having a density on the order of 40 lbs./ft³ (approximately 13:1 cenospheres to portland cement ratio).

As stated above, at an 85% ice fraction tanks 12, 112, 212 hold approximately 5 million pounds of ice. This volume produces a total buoyant force of approximately 500,000 pounds. Thus, the overall weight of floating tops 70, 170, 270 must exceed 500,000 pounds, for example, 600,000 pounds. Since the floating top is formed of concrete material having a density less than that of water, the top will float when there is a small charge of ice (FIGS. 6 and 8). When there is a full charge of ice (FIGS. 7 and 9) the top will still float, while exerting sufficient downward force to submerge the ice.

The lightweight concrete blocks of tops 170 and 270 are not rigidly interconnected in order to permit them to float at different levels on the contents of the tank. However, it may be desirable to loosely interconnect the blocks by means of elastic straps, or the like.

As an alternative to concrete blocks, the discrete elements of the top may be formed of "bags" containing a particulate mixture that floats. The bags may take the form of coated, woven fiberglass bags, or other suitable bags. A preferred particulate mixture is one that contains cenospheres. The density of this mixture can be readily varied by varying the proportion of cenospheres to heavier particles contained in the mixture. As with the concrete blocks, it may be desirable to loosely interconnect the bags, for example, by woven elastic straps, or the like.

As discussed above, the preferred location for returning the elevated temperature return water is at the top of the tank where it melts the ice mass from the top down. Since a uniform top planar melting is preferred, a uniform dispersement of the return water should be achieved. In the illustrated embodiments, best shown in FIG. 2, the return is achieved by an H-manifold 80 having multiple (approximately 100) outlet ports located at the top plane of the ice mass. A portion of the manifold is located above top 70, with conduits extending through the top to reach the ice mass.

One additional advantage of the floating top structure illustrated in the drawings is that a linear measurement scale may be provided to measure the flotation height of a portion of the top. Since the ice fraction in the tank is directly related to the height at which the top elements float, the scale permits one to continuously monitor the ice inventory.

Finally, it will be appreciated that the floating top and ice mass float on the water in the tank much as a ship or any other vessel floats. Therefore, the same hydrodynamic stability principles apply. In this regard, it is most desired that stability be enhanced by assuring that the center of buoyancy of the top/ice mass be above its center of gravity. It will be appreciated that a thermal storage tank system incorporating floating top 70, 170 or 270 and ice introduction system 40 achieves the following advantages:

1. Entrained air is not introduced into the tank with the introduction of the ice.
2. The solid/gas interface of ice to air is eliminated at the surface of the tank, thereby eliminating thermal losses due to sublimation.
3. The agglomerated ice mass is produced in a predictable shape and size so that it can be housed within a tank having a shape and size that roughly approximates that of the ice mass, thereby reducing dead spaces in the tank, reducing construction costs for the tank and reducing thermal losses at the boundaries of the tank.
4. The thermal energy that can be stored in the tank is maximized.
5. The return water to the tank which is at an elevated temperature due to the cooling of a load may be uniformly distributed at the top of the ice mass to encourage a substantially uniform planar melt of the ice mass at its top surface, thereby producing a predictable and symmetrical melt that enables the ice mass to retain its essential shape and buoyant stability.

Figure 10:
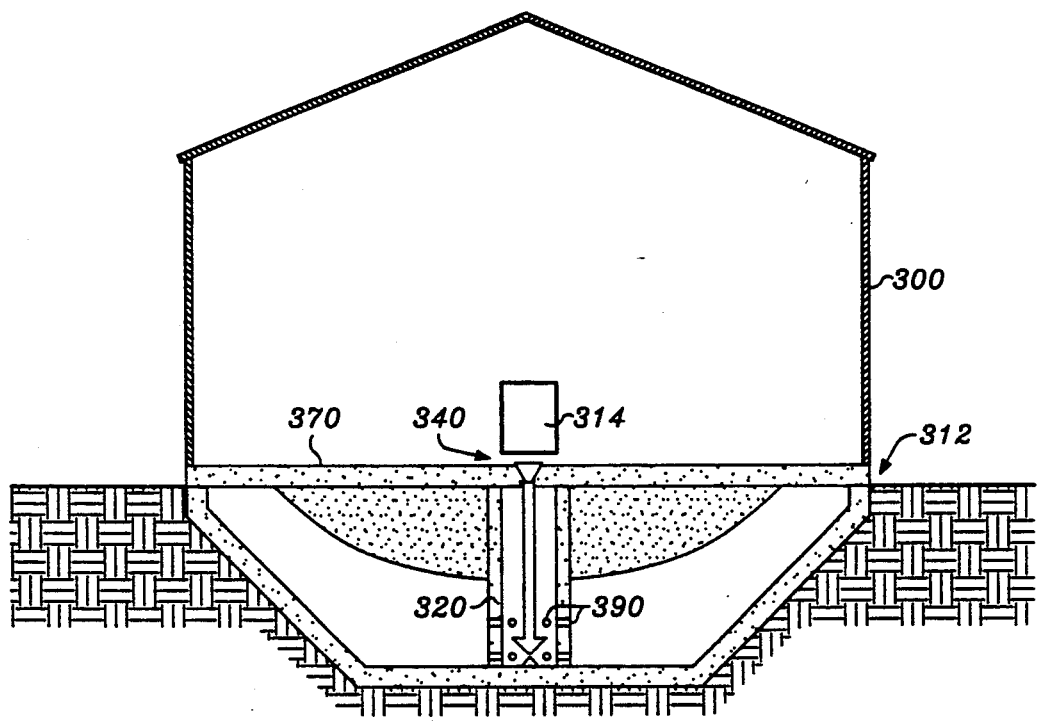
FIG. 10 is a cross sectional, somewhat schematic illustration of a storage tank of the present invention that forms the foundation of a building in which thermal energy stored in the tank is used.

FIG. 10 illustrates a special application of the storage tank system of the present invention. Storage tank has a wall structure substantially identical to that of tank 12 illustrated in FIG. 2 with the exception that the tank serves the dual role of a thermal storage tank and a foundation for a building 300 in which the thermal energy stored in the tank is used. Tank 312 has a bottom wall and inclined wall structure defining an inverted frustrum. The walls are produced from a concrete material incorporating cenospheres as the primary aggregate. An ice machine 314 and associated ice introduction system 340 serve to provide ice to tank 312 in a manner identical to that described above. Tank 312 includes a central support column 320 which may be formed of structural steel, concrete or other suitable structural material, and which serves as a central support for a cenosphere-concrete top 370. Top 370 is also supported along its entire perimeter at the upper portion of the inclined tank walls. Column 320 includes openings 390 to permit water flow therethrough. Top 370 serves not only as the top for tank 312, but also as the floor for building 300. The structural properties of cenosphere-aggregate concrete make possible a tank top/warehouse floor span of approximately 80 feet.

While the present invention has been described with primary reference to a cold thermal storage tank for storing an agglomerated ice mass which provides the significant benefit of the utilization of the 144 BTUs/lb. latent phase change energy of ice, other thermal storage media such as chilled water, solutions containing antifreeze, and paraffin (hot storage) may be used as the thermal storage medium.

The manner and means for delivering water to the ice machine for ice making, delivering water to the ice machine for the water wash, and other water movement systems have not been described in detail herein, but can be accomplished through conventional means. However, many of the advantages described above are best achieved by the return of elevated temperature return water over substantially the entire upper surface area of the ice mass, and by the introduction of the ice at a single submerged point near the bottom of the tank.

While the invention has been described in connection with certain illustrated embodiments, it will be appreciated that modifications may be made without departing from the true spirit and scope of the invention.

That which we claim is:

1. A thermal storage tank of the type that stores thermal energy in a floating agglomerated ice mass, said tank including a floating agglomerated ice mass, a top floating on said floating agglomerated ice mass to produce a downward counter-buoyant force to the ice mass, said top having a greater weight per unit area in portions that overlie thicker parts of the ice mass and less weight per unit area in portions that overlie thinner parts of the ice mass.

2. A thermal storage tank as claimed in claim 1 wherein said top has a greater weight per unit area at the center thereof and progressively less weight per unit area toward its perimeter.

3. A thermal storage tank as claimed in claim 2 wherein the progressively less weight per unit area of said top from the center thereof toward its perimeter is proportionate to the progressively lesser buoyant force of the ice mass thereunder from the center of the ice mass toward its outer portions.

4. A thermal storage tank as claimed in claim 1 wherein said top comprises discrete floatable elements having varying weight per unit area.

5. A thermal storage tank as claimed in claim 4 wherein said discrete floatable elements comprise elements having substantially the same density, with the elements located over thicker parts of the ice mass having the greatest thickness and the elements located over thinner parts of the ice mass having less thickness.

6. A thermal storage tank as claimed in claim 4 wherein said discrete floatable elements comprise elements having substantially the same thickness, with the elements located over thicker parts of the ice mass having the greatest density and the elements located over thinner parts of the ice mass having less density.

7. A thermal storage tank as claimed in claim 4 wherein said discrete floatable elements are formed of concrete material whose primary aggregate comprises cenospheres.

8. A thermal storage tank as claimed in claim 4 wherein said discrete floatable elements comprise bag-like structures filled with a particulate mixture which include hollow, gas filled particles.

* * * * *